United States Patent
Tier et al.

(10) Patent No.: US 7,416,232 B2
(45) Date of Patent: Aug. 26, 2008

(54) VEHICLE SIDE STEP

(75) Inventors: Matthew C. Tier, Brighton, MI (US); Jason S. Thorson, Farmington, MI (US)

(73) Assignee: Nissan Technical Center North America, Inc., Farmington Hills, MI (US)

( * ) Notice: Subject to any disclaimer, the term of this patent is extended or adjusted under 35 U.S.C. 154(b) by 0 days.

(21) Appl. No.: 11/316,131

(22) Filed: Dec. 22, 2005

(65) Prior Publication Data

US 2007/0145754 A1  Jun. 28, 2007

(51) Int. Cl.
*B60R 3/00* (2006.01)
(52) U.S. Cl. .................................. 293/117; 280/163
(58) Field of Classification Search ................ 293/117; 280/163, 164.1, 291
See application file for complete search history.

(56) References Cited

U.S. PATENT DOCUMENTS

| | | | |
|---|---|---|---|
| 3,171,671 A * | 3/1965 | Cornett | 280/163 |
| 4,569,533 A | 2/1986 | Gronert et al. | |
| 5,538,265 A * | 7/1996 | Chen et al. | 280/163 |
| 5,566,962 A * | 10/1996 | Burnham | 280/163 |
| 5,788,321 A | 8/1998 | McHorse et al. | |
| 6,178,364 B1 | 1/2001 | Delurey et al. | |
| 6,412,799 B1 | 7/2002 | Schrempf | |
| 6,702,329 B1 | 3/2004 | Nishio | |
| 6,840,526 B2 | 1/2005 | Anderson et al. | |

* cited by examiner

*Primary Examiner*—Joseph D. Pape
(74) *Attorney, Agent, or Firm*—Young Basile Hanlon Macfarlane & Helmholde P.C.

(57) ABSTRACT

An embodiment of a vehicle step assembly includes a brace defined, at least in part, by a generally horizontal surface. The generally horizontal surface selectively transmits the weight of a user to the vehicle. The assembly further includes a fascia having an aperture. The brace is positioned, at least partially, at a generally lateral side portion of the vehicle rearward of a rearmost operational wheel. The fascia at least partially encloses a portion of the lateral side portion.

25 Claims, 5 Drawing Sheets

VEHICLE SIDE STEP

TECHNICAL FIELD

The technical field relates generally to steps and more specifically to steps for access to upper portions of a vehicle.

BACKGROUND

Numerous step and running board assemblies are provided for vehicles. Typically, these assemblies assist a user to access the interior portions or upper portions of the vehicles, for example, items stowed above the vehicle roof. In order to transmit the weight of a user to the vehicle, the assemblies are typically secured directly to the frame of the vehicle. Typically, body mounting locations have not been found to be acceptable for many vehicles due to, for example, difficulty of mounting, and stability of the step when not mounted to a vehicle frame.

A typical vehicle side step is located between the operational wheels of the vehicle. With the desired utility of a vehicle increasing, there exists a need to locate a vehicle step at locations other than between the operational wheels. Many newer vehicles include front and rear fascia that are typically constructed of injection molded plastic. The aerodynamics and aesthetically pleasing aspects of a molded fascia have discouraged mounting a step with a fascia.

While these prior art steps perform adequately for their intended purposes, steps are an area of continuous innovation to provide lighter, less expensive, and more aesthetically pleasing components.

SUMMARY

An embodiment of a vehicle step assembly includes a brace defined, at least in part, by a generally horizontal surface. The generally horizontal surface selectively transmits the weight of a user. The assembly further includes a fascia having an aperture. The brace is positioned, at least partially, at a generally lateral portion of the vehicle rearward of a rearmost operational wheel. The fascia at least partially encloses a portion of the lateral side portion.

In a further embodiment, a recessed vehicle step includes a brace defined, at least in part, by a generally horizontal surface. The weight of a user is selectively transmitted to the vehicle by the generally horizontal surface. The step also includes a fascia having an aperture formed therein, and a fascia insert at least partially interposed within the aperture and defining a surface portion of the step. The fascia insert at least partially encloses at least a portion of the brace. The step further includes a support member selectively supporting the brace.

In another embodiment, a method of manufacturing a vehicle side step includes coupling a brace to a vehicle body, and positioning a fascia adjacent the brace. At least a portion of the brace is selectively interposed through an aperture in the fascia.

DETAILED DESCRIPTION

Figure 1:
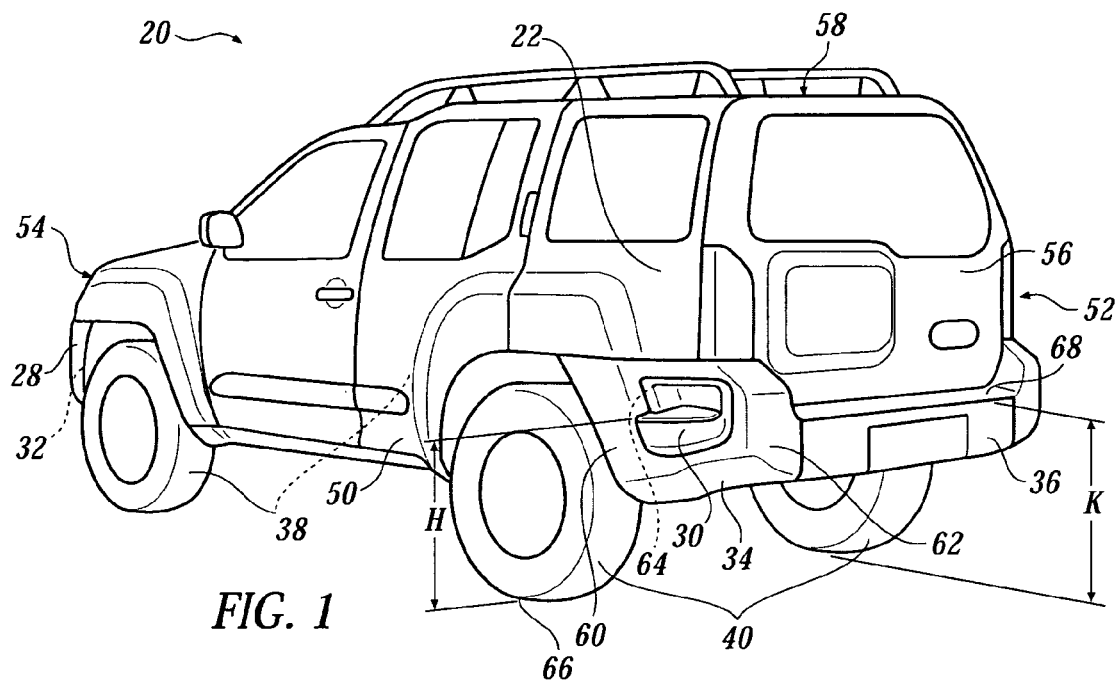
FIG. 1 is a perspective view of a vehicle including a side step according to an embodiment.
Figure 2:
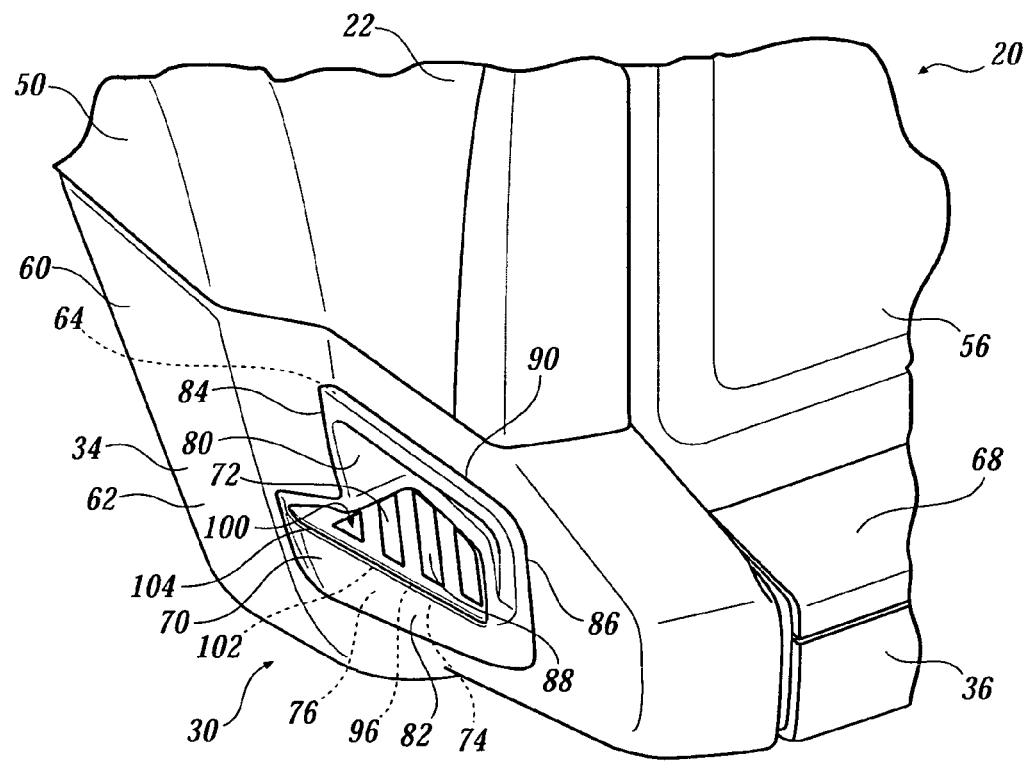
FIG. 2 is a perspective view of the side step of FIG. 1.
Figure 3:
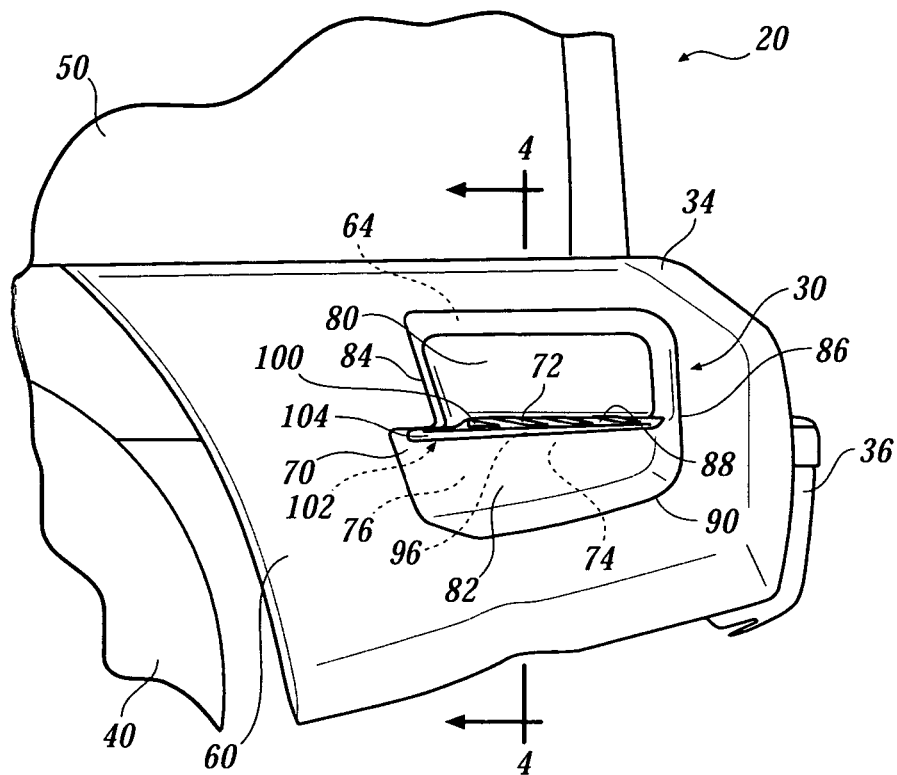
FIG. 3 is a side view of the side step of FIG. 2.

FIG. 1 illustrates a vehicle 20. Vehicle 20 includes a body 22, a front fascia 28, a side step 30, a front bumper 32, a rear fascia 34, a rear bumper 36, a pair of front operational wheels 38, and a pair of rear operational wheels 40. As illustrated, the side step 30 is rearward of the rear wheels 40. The body 22 includes a first lateral side 50, a second lateral side 52, a front end 54, a rear end 56, and a roof 58. Generally, the body 22 is formed of sheet steel welded in desired locations.

The rear fascia 34 includes a wheel faring 60, an outer surface 62 and an aperture 64 through which at least a portion of the side step 30 extends. In the embodiment illustrated, the side step 30 is positioned to provide support for a user (not shown), and is at a height H above a lowermost portion 66 of the rear wheels 40 to permit the user to conveniently use the side step 30. As best illustrated in FIG. 1, the side step 30 may permit the user to access rear and side portions of the roof 58. The rear bumper 36 includes an upper surface 68 positioned at a height K above the lowermost portion 66 of the rear wheels 40. Upper surface 68 of the rear bumper 36 may support a user as the user accesses rear portions of the roof 58.

Figure 4:
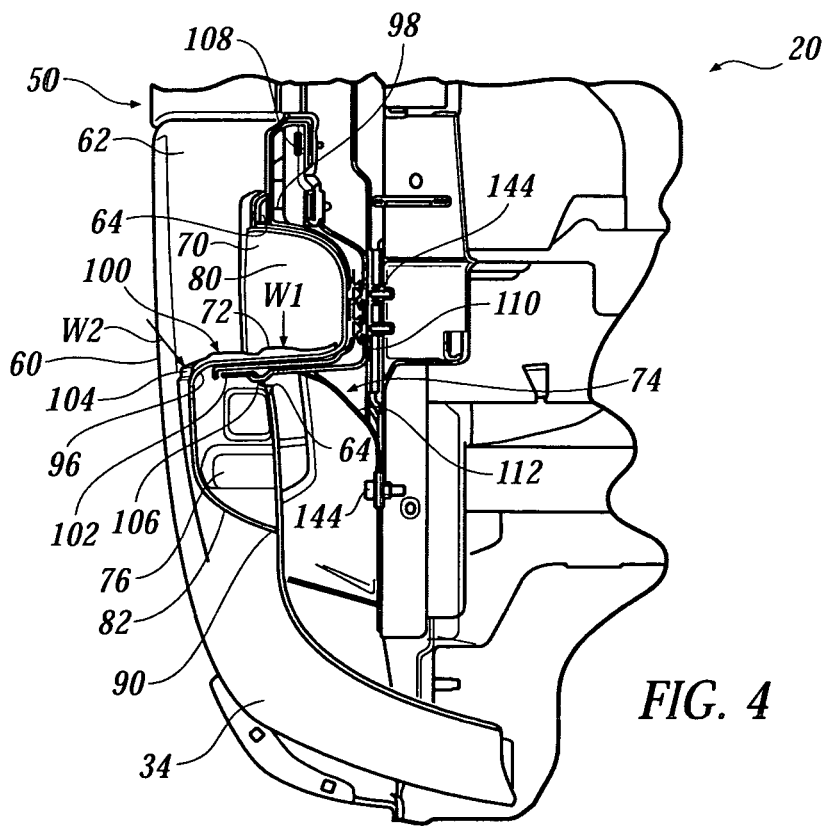
FIG. 4 is an enlarged partial rear sectional view taken along line 4-4 of FIG. 3.

FIGS. 2-5 illustrate the side step 30 to include a fascia insert 70, a tread 72, a brace 74, and spacers 76. In the embodiment illustrated, the fascia insert 70 includes an upper concave portion 80, a lower convex portion 82, a front edge 84, a rear edge, 86, a generally horizontal step portion 88, and a peripheral edge 90. The step portion 88 has attachment apertures 84 formed therein, as discussed below. As best seen in FIG. 4, the intersection of the lower convex portion 82 and the step portion 88 defines a generally curved inner edge 96. The peripheral edge 90 has fasteners 98 attached thereto for coupling the fascia insert 70 to the rear fascia 34.

Figure 5:
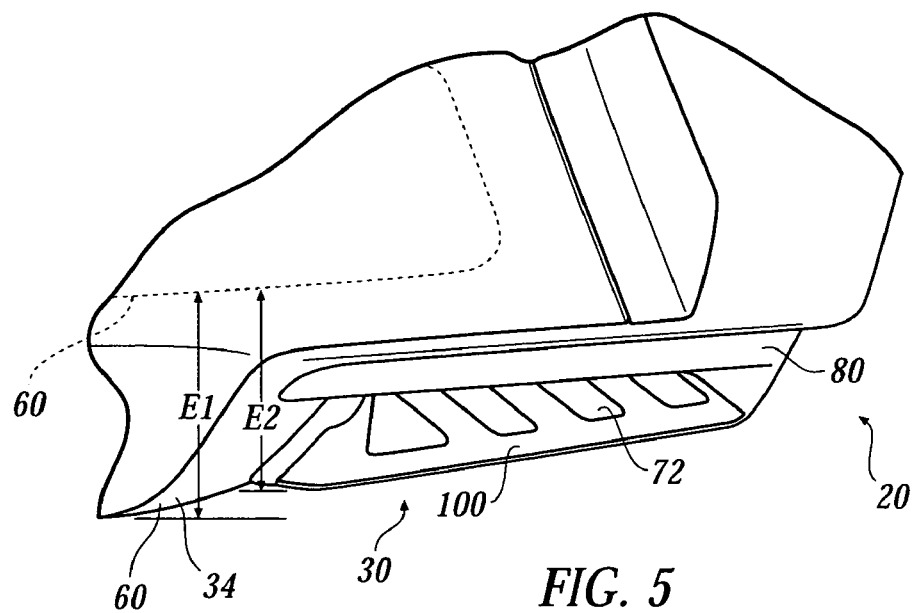
FIG. 5 is a top view of the side step of FIG. 1.

As best seen in FIG. 5, the rear fascia 34 extends a maximum distance E1 from the first lateral side 50 of the body 22. The side step 30 extends a maximum distance E2 from the first lateral side 50 of the body 22. The view of FIG. 5 is generally the view that a user will have when looking down on the side step 30. Accordingly, the user may visually locate the side step 30 prior to placing a foot on the side step 30. In this manner, the user, who may be supporting a load, or placing an item on the roof 58, may not need to blindly search for the side step 30 by moving the foot until contact with the side step 30 is made.

Figure 6:
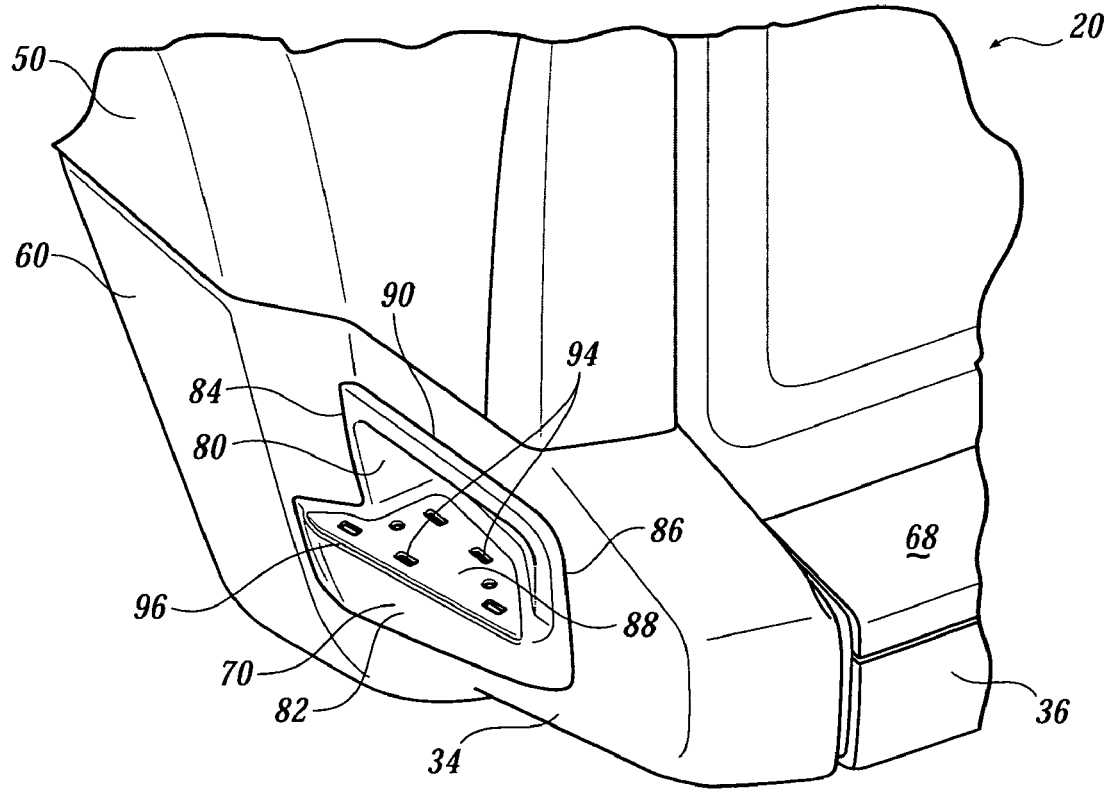
FIG. 6 is a perspective view similar to FIG. 2, with a tread removed for clarity.
Figure 7:
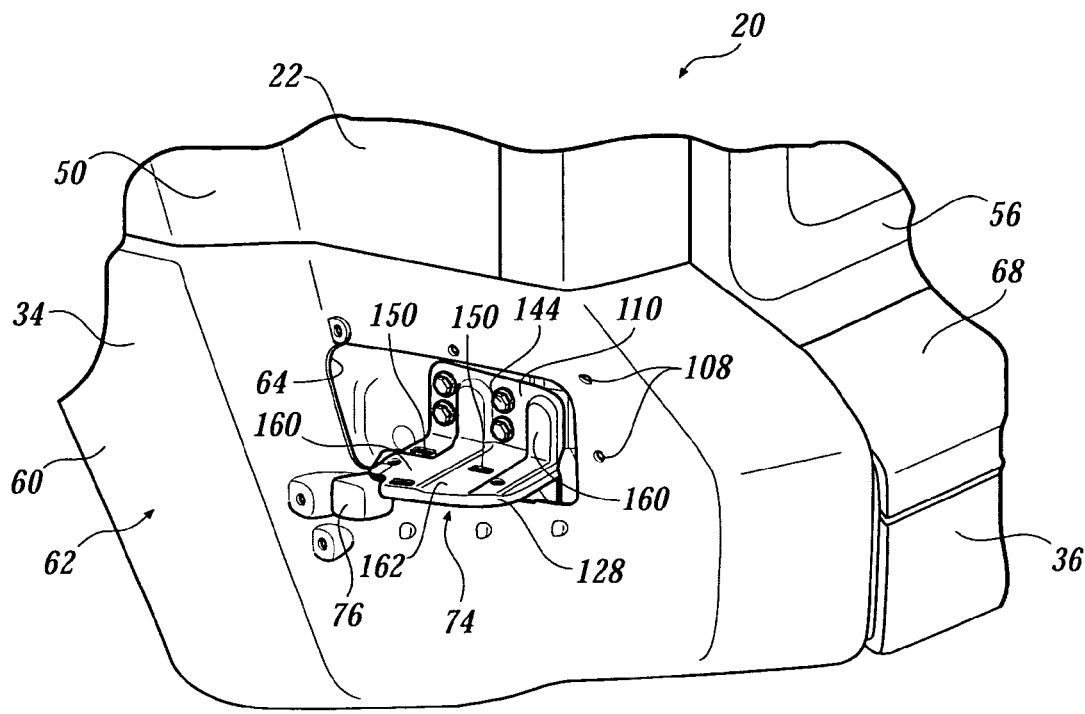
FIG. 7 is a perspective view of the side step of FIG. 1, with selected items removed for clarity.
Figure 8:
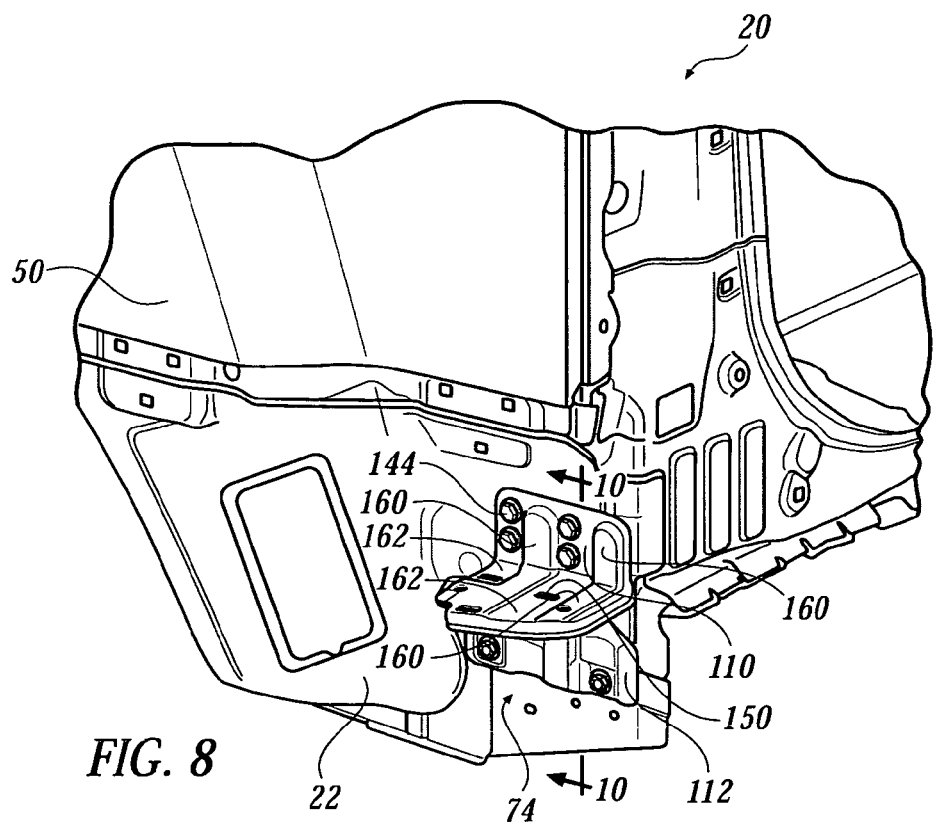
FIG. 8 is another perspective view of the side step of FIG. 1, with selected items removed for clarity.

FIGS. 6-8 illustrate the side step 30 with portions removed for clarity of explanation. Specifically, FIG. 6 illustrates the side step 30 with the tread 72 removed; FIG. 7 illustrates the side step 30 with the tread 72 and the fascia insert 70 removed and spacers 76 moved; and FIG. 8 illustrates the side step 30 with at least the tread 72, the fascia insert 70, and the spacers 76 removed, as discussed in greater detail below.

Figure 9:
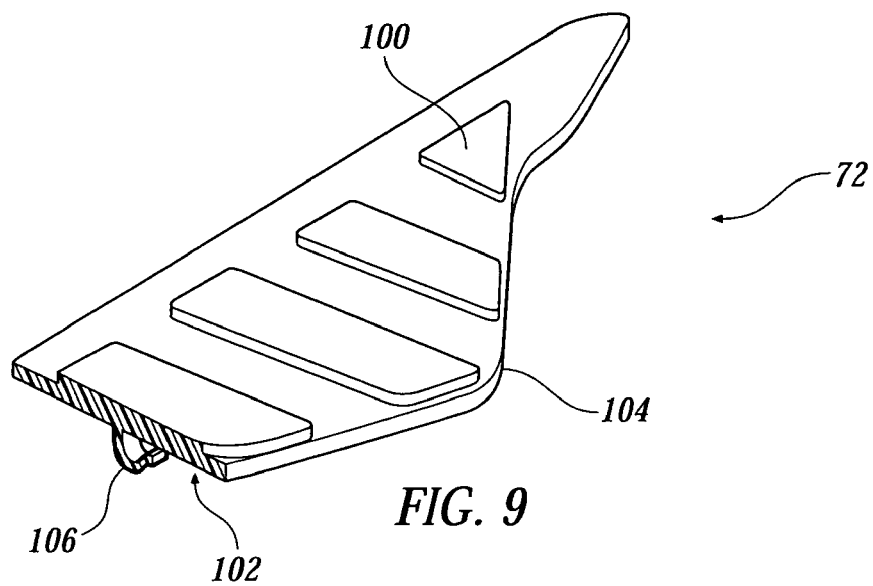
FIG. 9 is an enlarged sectional view of an embodiment of a tread.

As best seen in FIG. 4 or 9, the tread 72 includes an upper tread surface 100, a lower tread surface 102, an outer edge 104, and a plurality of clips 106 extending from the lower tread surface 102. The upper tread surface 100, illustrated in differing embodiments in FIGS. 2-5 and 9, may have a desired roughness or a surface appearance complementary to portions of the rear bumper 36 such as the upper surface 68. The clips 106 may be integrally molded to other portions of the tread 72, or may attach to the tread 72 after the tread 72 is formed. Preferably, the clips 106 are generally curved and resilient in order to exert a coupling force on the brace 74, as discussed in greater detail below. As best seen in FIG. 7, the rear fascia 34 has fastener apertures 108 formed therein, as discussed below.

Figure 10:
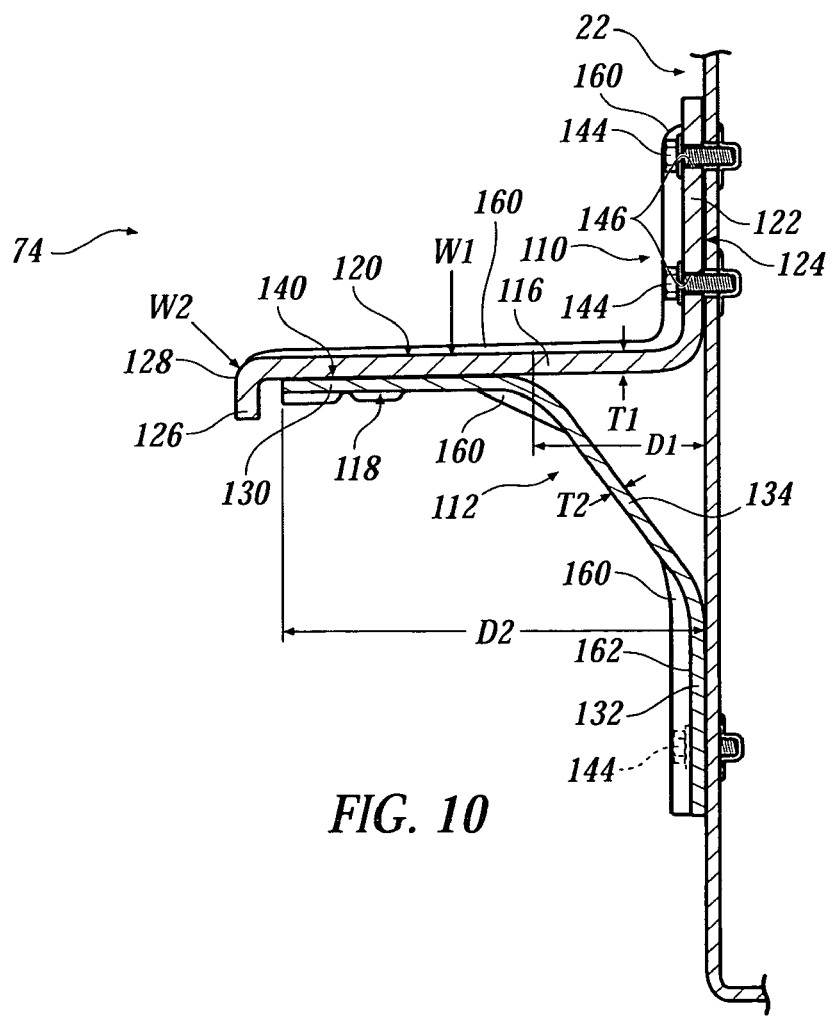
FIG. 10 is an enlarged rear sectional view of a brace illustrated in FIG. 4

With reference to FIG. 10, the brace 74 includes an upper brace portion 110 and a lower support portion 112. The upper brace portion 110 has a generally constant thickness T1 and includes a first portion 116 having a support mounting surface 118 and a generally horizontal surface 120, and a second portion 122 having a body mounting surface 124, which is generally perpendicular to the first portion 116. Of course, the relative angles and shapes may vary as desired. The first portion 116 has an edge portion 126 that extends downwardly and generally perpendicular from the surface 120 and defines a generally curved outer edge 128. The outer edge 128 provides a smooth contoured surface that abuts the inner edge 96 of the fascia insert 70, as discussed below. The lower support portion 112 has a generally constant thickness T2 and includes a brace mounting portion 130, a body mounting portion 132, and a support portion 134 interposed therebetween. As discussed in greater detail below, T1 is greater than T2. The brace mounting portion 130 includes a brace mounting surface 140 that mates with the support mounting surface 118. Fasteners 144 are interposed through brace apertures 146 to secure the brace 74 to the body 22. The brace 74 includes generally rectangular tread mounting apertures 150 formed therein (FIGS. 7 and 8). The tread mounting apertures 150 may be formed in both the first portion 116 and the brace mounting portion 130, or only the first portion 116.

With continuing reference to FIG. 10, the lower support portion 112 will be described in greater detail. The brace mounting portion 130 and the body mounting portion 132 are generally perpendicular and oriented at an angle of about forty-five degree (45°) relative to the support portion 134. The lower support portion 112 extends away from the body 22 through a maximum distance of D1. At least a portion of the brace mounting portion 130 extends away from the body 22 through a maximum distance of D2. As best seen in FIG. 8, the first portion 116 and the brace mounting portion 130 are contoured such that a portion of the brace 74 nearest the front end 54 of the vehicle 20 extends further from the body 22 than a portion of the brace 74 nearest the rear end 56 of the vehicle 20. Generally, the rear fascia 34 has a similar contour along the lateral sides 50, 52 of the vehicle 20.

Referring briefly to FIGS. 7, 8, and 10, the brace 74 also has raised portions 160 formed therein with at least one depressed portion 162 positioned therebetween. The raised portions 160 are preferably formed in both the upper brace portion 110 and the lower support portion 112 during stamping and serve at least to structurally reinforce brace 74, thereby reducing the need for additional pieces and forming costs associated with attaching structural webs for reinforcement. Preferably, the raised portions 160 and the depressed portions 162 of the upper brace portion 110 have the same general thickness T1 after forming.

The upper concave portion 80 and the lower convex portion 82 of the side step 30 permit the brace 74 to be positioned such that the first portion 116 and the tread 72 of the brace 74 extend through the aperture 64. Thus positioned, the tread 72 is readily discernable by a user, even in lower light conditions, while not extending an undesired distance from the outer surface 62 of the rear fascia 34.

One method of assembling the side step 30 is as follows. A portion of sheet steel (not shown) of about thickness T1 is formed into the configuration of the upper brace portion 110, as best seen in FIGS. 7, 8, and 10. A portion of sheet steel (not shown) of about thickness T2 is formed into the configuration of the lower support portion 112. The upper brace portion 110 is positioned adjacent to the lower support portion 112 in a desired orientation and spot welded thereto to form the brace 74. The brace 74 is positioned adjacent to the body 22 and fasteners 144 are interposed through brace apertures 146 and secured to body 22, as best illustrated in FIGS. 7, 8, and 10.

The rear fascia 34 is then coupled to the vehicle 20 and the spacers 76 are coupled to the rear fascia 34, as best illustrated in FIG. 7. In the embodiment illustrated, the brace 74 is interposed through aperture 64 of the rear fascia 34. As best illustrated in FIG. 4, the spacers 76 support the lower convex portion 82 to provide resistance to permanent distortion of the lower convex portion 82.

The fascia insert 70 is then positioned at least partially within the aperture 64 of the rear fascia 34 and above the horizontal surface 120 of the brace 74, as best illustrated in FIG. 6. The attachment apertures 94 of the fascia insert 70 are aligned with the tread mounting apertures 150. The fascia insert 70 may also be attached to the rear fascia 34 about the peripheral edge 90 with fasteners 98 (FIG. 4) inserted into fastener apertures 108 (FIG. 7) to ensure a generally continuous contact between the peripheral edge 90 of the fascia insert 70 and the outer surface 62 of the rear fascia 34.

The tread 72 is then coupled to the first portion 116 of the brace 74 with the step portion 88 of the fascia insert 70 interposed therebetween, as best seen in FIGS. 2-5. The clips 106 of the tread 72 is interposed through both the attachment apertures 94 and the tread mounting apertures 150, as discussed in greater detail below and best seen in FIG. 4. The clips 106 preferably do not contact the fascia insert once the side step 30 is fully assembled, as best seen in FIGS. 1-5.

Preferably, the fascia insert 70 is molded of material similar to the rear fascia 34. Also preferably, the rear fascia may be molded without the aperture 64 formed therein, and at least one of the apertures 64 may be formed in a rear fascia 34 when a side step 30 is desired to be coupled to the vehicle 20. Therefore, only one type of rear fascia 34 (without the aperture 64) need be produced for vehicles that are later identified as vehicles that will or will not be assembled with a side step, such as the side step 30. Accordingly, the number of different components that must be in stock for production is reduced.

Preferably, the brace mounting portion 130 is welded to the support mounting surface 118. Welding eliminates the existence of fasteners extending through the horizontal surface 120 and may provide a more stable brace 74 under loading. Also preferably, the thickness T1 of the upper brace portion 110 is greater than the thickness T2 of the lower support portion 112. This difference in thicknesses saves weight and material costs while permitting the upper brace portion 110 to support the weight of a user in conjunction with the lower support portion 112.

In the embodiment illustrated, the side step 30 is coupled to the body 22 rearward of the rearmost operational wheels 40. Preferably, the brace 74 will support between about four hundred (400) to about five hundred (500) pounds. Also preferably, the brace 74 is constructed of steel with the thickness T1 being about 3.0 mm and the thickness T2 being about 2.3 mm. A ratio of T1/T2 of about 1.3 to 1 has been found to provide optimal maximum support of weight when the distance D2 is about twice the distance D1.

Any deformation of the brace 74 under loading will deflect portions of the fascia insert 70 and the rear fascia 34. The deflection of the fascia insert 70 and the rear fascia 34 is easily absorbed by materials such as plastics suitable for injection molding, as fascias generally flex and return to shape under loadings associated with conventional applications.

Also in the embodiment illustrated, the fascia insert 70 and the tread 72 may be of generally the same color, gloss and texture as the rear fascia 34, or may of be a complementary color, gloss and texture. As best seen in FIG. 5, the front edge 84 of the fascia insert 70 does not extend further from the body 22 than portions of the rear fascia 34 forward of the side step 30, such as the wheel faring 60, as the distance E1 is greater than the distance E2. Therefore, the side step 30 may be contoured with the curvature of the rear fascia 34 along the first lateral side 50 of the vehicle 20. Preferably, the rear fascia 34 and the fascia insert 70 are constructed of the same material, and even more preferably, the rear fascia 34 and the fascia insert 70 are constructed of a polypropylene such as is used in conventional vehicle fasciae. The tread 72 is preferably constructed of a pliable, resilient material, such as a rubber or other elastomer.

As best seen in FIG. 1, the height H of the side step 30 is generally complementary to the height K of the upper surface 68 of the rear bumper 36 in order to permit a user to conveniently step between the side step 30 and the rear bumper 36. Additionally, the user may stand with one foot on the side step 30 and another foot on the upper surface 68 in order to access rear and side portions of the roof 58. The lowermost portion 66 of the rear wheels 40 serves as a reference location for comparison purposes of the relative distances of height H and height K. Preferably, height H and height K are about equal, although they may be varied if desired since the side step 30 is not attached to the rear bumper 36. The height H is generally the distance between a portion of the upper tread surface 100 and the lowermost portion 66.

Generally, the weight W1 (FIGS. 4 and 10) of a user (not shown) as the user contacts the tread 72 may be transmitted through the surface 120 of the brace 74. The weight W1 is partially supported by the upper brace portion 110 and partially supported by the lower support portion 112. The upper brace portion 110 must withstand shear, bending, and tensile loadings throughout the first portion 116 and the second portion 118 to support the weight W1.

The weight W2 (FIGS. 4 and 10) of a user (not shown) as the user initially contacts the tread 72 may be transmitted through the outer edge 128 of the brace 74. When the fascia insert 70 is constructed of a pliable material of generally constant thickness, higher shear stresses within the fascia insert are experienced along the inner edge 96 (FIG. 4) as the user exerts the weight W2. Accordingly the outer edge 128 provides a smooth contoured surface that abuts the inner edge 96 of the fascia insert 70 and distributes the weight W2 along the inner edge 96. As best seen in FIG. 7, the edge portion 126 of the first portion 116 has a generally sharp edge created by surfaces that meet at about ninety degree angles. Accordingly, the edge portion 126 and the outer edge 128 prevent the inner edge 96 from contacting a sharp edge of the first portion 116 in order to reduce the wear and likelihood of damage to the fascia insert 70 during use.

As best seen in FIGS. 7 and 8, the tread mounting apertures 150 of the brace 74 are formed in the depressed portions 162. In this manner, the tread 72 may be slightly deformed during installation such that tread portions immediately adjacent the clips 106 (FIG. 9) are deflected toward the brace 74 and into engagement with the tread mounting apertures 150. After engagement of the clips 106 and the tread mounting apertures 150, the tread 72 may recover such that the clips 106 are in a tighter engagement with the brace 74. This recovery of the tread 72 may increase the securing force between clips 106 and the brace 74, and/or may engage the clips 106 further with the brace 74. Accordingly, the raised portions 160 and depressed portions 162 may increase the securing force between clips 106 and brace 74 in addition to the structural advantages previously discussed.

The preceding description has been presented only to illustrate and describe exemplary embodiments of the methods and systems of the present invention. It is not intended to be exhaustive or to limit the invention to any precise form disclosed. It will be understood by those skilled in the art that various changes may be made and equivalents may be substituted for elements thereof without departing from the scope of the invention. In addition, many modifications may be made to adapt a particular situation or material to the teachings of the invention without departing from the essential scope. Therefore, it is intended that the invention not be limited to the particular embodiment disclosed as the best mode contemplated for carrying out this invention, but that the invention will include all embodiments falling within the scope of the claims. The invention may be practiced otherwise than is specifically explained and illustrated without departing from its spirit or scope. The scope of the invention is limited solely by the following claims.

What is claimed is:

1. A vehicle step assembly, comprising:
   a vehicle body structure;
   a step brace fixedly coupled to the vehicle body structure and extending generally horizontally outboard from a lateral side of the vehicle body structure, the step brace configured to selectively transmit a weight applied thereon to the vehicle body structure;
   a fascia covering at least a portion of the lateral side of the vehicle body structure and defining an outer surface of the vehicle, the fascia having an aperture formed therein and arranged laterally spaced apart from the vehicle body structure without structural support in an area proximal to the aperture, the step brace extending through the aperture without contacting the fascia and the distal end of the step brace extending beyond the outer surface of the fascia proximal to the aperture; and
   a fascia insert at least partially disposed within the aperture to conceal the step brace and define a step portion.

2. The vehicle step assembly of claim 1, wherein the step brace includes an upper brace portion having a first portion and a second portion, the first portion extending generally horizontally outboard from the lateral side of the vehicle body structure and the second portion connected to the vehicle body structure.

3. The vehicle step assembly of claim 2, wherein the first portion and the second portion of the upper brace portion are generally perpendicular oriented.

4. The vehicle step assembly of claim 2, wherein the step brace includes a lower brace portion having a brace mounting portion connected to the first portion of the upper brace portion and a body mounting portion connected to the vehicle body structure.

5. The vehicle step assembly of claim 4, wherein the upper brace portion has a first general thickness and the lower support has a second general thickness, and wherein the first thickness is greater than the second thickness.

6. The vehicle step assembly of claim 1, further comprising:
   a wheel faring extending a first predetermined distance from the lateral side of the vehicle body structure,
   wherein the step portion extends a second predetermined distance from the lateral side of the vehicle body structure, and wherein the second predetermined distance is less than the first predetermined distance.

7. The vehicle step assembly of claim 1, wherein the step portion is positioned rearward of a rearmost operational wheel of the vehicle.

8. The vehicle step assembly of claim 7, further comprising a bumper assembly disposed along the rear of the vehicle having at least an upper surface, wherein a height of the step portion from ground level generally corresponds with a height of the surface of the bumper assembly.

9. The vehicle step assembly of claim 1, wherein the fascia insert includes a concave portion formed above the step portion to increase the effective area of the step portion.

10. The vehicle step assembly of claim 1, wherein the fascia insert includes a convex portion formed below the step portion, the convex portion defining an outer periphery of the step portion.

11. The vehicle step assembly of claim 1, further comprising a tread coupled to the step portion of the fascia insert to define an upper tread surface of the step portion.

12. A vehicle step assembly, comprising:
a step brace connected to a vehicle body structure and having a generally horizontally oriented step portion;
a fascia having an aperture formed therein;
a fascia insert at least partially disposed within the aperture to conceal the step brace and define a step portion; and
a wheel well extending a first predetermined distance from a lateral side of the vehicle body structure,
wherein the step portion of the brace extends through the aperture of the fascia and wherein the fascia insert is configured and arranged such that the distal end of the step portion extends a second predetermined distance from the lateral side of the vehicle body structure,
wherein the second predetermined distance is less than the first predetermined distance.

13. The vehicle side step structure of claim 12, wherein the step brace includes an upper brace portion having a first portion and a second portion, the first portion extending generally horizontally outboard from the lateral side of the vehicle body structure and the second portion connected to the vehicle body structure.

14. The vehicle side step structure of claim 13, wherein the first portion and the second portion of the upper brace portion are generally perpendicular oriented.

15. The vehicle side step structure of claim 13, wherein the step brace includes a lower brace portion having a brace mounting portion connected to the first portion of the upper brace portion and a body mounting portion connected to the vehicle body structure.

16. The vehicle side step structure of claim 15, wherein the upper brace portion has a first general thickness and the lower support has a second general thickness, and wherein the first thickness is greater than the second thickness.

17. The vehicle side step structure of claim 12, wherein the step portion is positioned rearward of a rearmost operational wheel of the vehicle.

18. The vehicle side step structure of claim 17, further comprising a bumper assembly disposed along the rear of the vehicle having at least an upper surface, wherein a height of the step portion from ground level generally corresponds with a height of the surface of the bumper assembly.

19. A vehicle step assembly, comprising:
a step brace connected to a vehicle body structure and having a generally horizontally oriented step portion;
a fascia having an aperture formed therein, a portion of the step brace extending through the aperture of the fascia;
a fascia insert at least partially disposed within the aperture to conceal the step brace and define a step portion; and
a bumper assembly disposed along the rear of the vehicle having at least an upper surface,
wherein a height of the step portion from ground level generally corresponds with a height of the upper surface of the bumper assembly.

20. The vehicle side step structure of claim 19, wherein the step brace includes an upper brace portion having a first portion and a second portion, the first portion extending generally horizontally outboard from the lateral side of the vehicle body structure and the second portion connected to the vehicle body structure.

21. The vehicle side step structure of claim 20, wherein the first portion and the second portion of the upper brace portion are generally perpendicular oriented.

22. The vehicle side step structure of claim 20, wherein the step brace includes a lower brace portion having a brace mounting portion connected to the first portion of the upper brace portion and a body mounting portion connected to the vehicle body structure.

23. The vehicle side step structure of claim 22, wherein the upper brace portion has a first general thickness and the lower support has a second general thickness, and wherein the first thickness is greater than the second thickness.

24. The vehicle side step structure of claim 19, further comprising:
a wheel faring extending a first predetermined distance from the lateral side of the vehicle body structure,
wherein the step portion extends a second predetermined distance from the lateral side of the vehicle body structure, and wherein the second predetermined distance is less than the first predetermined distance.

25. The vehicle side step structure of claim 19, wherein the step portion is positioned rearward of a rearmost operational wheel of the vehicle.

* * * * *